(12) United States Patent
Itagaki et al.

(10) Patent No.: US 8,130,409 B2
(45) Date of Patent: Mar. 6, 2012

(54) IMAGE FORMING APPARATUS

(75) Inventors: Tomohisa Itagaki, Chiba (JP); Jiro Ishizuka, Ibaraki (JP); Nobuhiko Zaima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 927 days.

(21) Appl. No.: 10/863,499

(22) Filed: Jun. 9, 2004

(65) Prior Publication Data

US 2005/0007609 A1 Jan. 13, 2005

(30) Foreign Application Priority Data

Jun. 11, 2003 (JP) ................................ 2003-166876

(51) Int. Cl.
*G03F 3/06* (2006.01)
*G05K 15/02* (2006.01)
*H04N 1/60* (2006.01)
*H06N 1/403* (2006.01)
*H04N 1/40* (2006.01)
*B41J 2/15* (2006.01)
*G03G 17/04* (2006.01)
*G03G 15/00* (2006.01)

(52) U.S. Cl. ........... 358/1.2; 358/519; 358/1.9; 358/2.1; 358/3.02; 347/41; 399/131; 399/49

(58) Field of Classification Search ................ 358/1.15, 358/1.2, 1.9, 3.1, 300, 447, 513, 254, 406, 358/1.18, 463, 500, 505; 347/131, 132, 133, 347/139, 252; 382/312; 399/49

See application file for complete search history.

(56) References Cited

U.S. PATENT DOCUMENTS

| | | | | |
|---|---|---|---|---|
| 5,132,786 A * | 7/1992 | Ishiwata | .................... | 358/500 |
| 5,204,755 A * | 4/1993 | Taga et al. | .................... | 358/400 |
| 5,583,620 A * | 12/1996 | Miyamoto | .................... | 399/208 |
| 5,694,223 A * | 12/1997 | Katori et al. | .................... | 358/300 |
| 5,742,317 A * | 4/1998 | Kashihara | .................... | 347/131 |
| 5,841,552 A * | 11/1998 | Atobe et al. | .................... | 358/447 |
| 6,034,788 A * | 3/2000 | Sasanuma et al. | .................... | 358/406 |
| 6,106,093 A * | 8/2000 | Nagoshi et al. | .................... | 347/15 |
| 6,108,105 A * | 8/2000 | Takeuchi et al. | .................... | 358/1.2 |
| 6,172,765 B1 * | 1/2001 | Kawamoto | .................... | 358/1.2 |
| 6,172,771 B1 * | 1/2001 | Ikeda et al. | .................... | 358/406 |
| 6,215,560 B1 * | 4/2001 | Shimura et al. | .................... | 358/1.2 |
| 6,281,983 B1 * | 8/2001 | Takahashi et al. | .................... | 358/1.2 |
| 6,415,171 B1 * | 7/2002 | Gueziec et al. | .................... | 600/407 |
| 6,417,932 B1 * | 7/2002 | Hirota et al. | .................... | 358/1.2 |
| 6,463,227 B1 * | 10/2002 | Denton et al. | .................... | 358/406 |
| 6,473,538 B2 * | 10/2002 | Kozuka | .................... | 382/312 |
| 6,608,943 B1 * | 8/2003 | Hirashima | .................... | 358/1.2 |

(Continued)

FOREIGN PATENT DOCUMENTS

JP 59-221165 A 12/1984

(Continued)

*Primary Examiner* — King Poon
*Assistant Examiner* — Akwasi M Sarpong
(74) *Attorney, Agent, or Firm* — Fitzpatrick, Cella, Harper & Scinto

(57) ABSTRACT

The image forming apparatus includes image forming device for forming an image, switching device for switching resolution of an image formed by the image forming device, processing device for performing stabilization processing for stabilizing quality of the image formed by the image forming device and changing device for changing a processing procedure of the stabilization processing in accordance with the resolution switched by the switching device. With these features, it is possible to avoid deterioration of image quality even if the resolution is switched.

5 Claims, 19 Drawing Sheets

U.S. PATENT DOCUMENTS

| | | |
|---|---|---|
| 6,678,072 B1 * | 1/2004 | Matsuoka et al. ............ 358/2.1 |
| 6,894,804 B2 * | 5/2005 | Nguyen et al. ................ 358/1.2 |
| 6,906,822 B1 * | 6/2005 | Nohnishi ..................... 358/1.16 |
| 6,927,877 B2 * | 8/2005 | Kanno et al. .................. 358/3.1 |
| 6,950,557 B2 * | 9/2005 | Kimura .......................... 358/1.2 |
| 6,975,426 B2 * | 12/2005 | Kuno et al. .................... 358/1.2 |
| 7,092,122 B2 * | 8/2006 | Iwaki ............................. 358/1.9 |
| 7,372,594 B1 * | 5/2008 | Kusakabe et al. ............. 358/1.9 |
| 2001/0019427 A1 * | 9/2001 | Komatsu ...................... 358/1.18 |
| 2001/0021042 A1 * | 9/2001 | Hirota et al. .................. 358/505 |
| 2002/0036783 A1 * | 3/2002 | Yoshidome ................... 358/1.9 |
| 2002/0135827 A1 * | 9/2002 | Saika ............................ 358/513 |
| 2003/0038952 A1 * | 2/2003 | Matsukubo et al. ........... 358/1.2 |
| 2003/0048326 A1 * | 3/2003 | Yamasaki et al. ............... 347/41 |
| 2003/0231801 A1 * | 12/2003 | Baggs et al. ................. 382/254 |
| 2004/0001220 A1 * | 1/2004 | Gorday et al. ............... 358/1.15 |
| 2004/0032628 A1 * | 2/2004 | Sato et al. ..................... 358/514 |
| 2007/0041057 A1 * | 2/2007 | Chen ............................. 358/474 |

FOREIGN PATENT DOCUMENTS

| | | |
|---|---|---|
| JP | 60-007263 A | 1/1985 |
| JP | 60-182868 A | 9/1985 |
| JP | 8-234510 | 9/1996 |
| JP | 10-198214 | 7/1998 |
| JP | 11-17947 A | 1/1999 |
| JP | 11-75067 A | 3/1999 |
| JP | 2000-181275 A | 6/2000 |
| JP | 2002-72574 A | 3/2002 |
| JP | 2002-72577 A | 3/2002 |
| JP | 2003-131447 | 5/2003 |

* cited by examiner

FIG. 17

```
...
AdobePS_Win_Driver_Incr_L2 begin
...
AdobePS_Win_Driver_Incr_L2 begin
%%BeginResource: procset AdobePS_Win_Compat 4. 2 0
10 scalefont setfont
%%EndResource
...
%%BeginDataCountedAtEnd: J0170f9d230486t
600 72 div 600 72 div scale
...
gsave % Image Reader gsave
/rows 11 def
/cols 7 def
285 409 translate
7 11 scale
...
/DeviceCMYK
} {/DeviceGray} ifalse
setcolorspace currentdict /PhotoshopDuotoneColorSpace undef currentdict
/PhotoshopDuotoneAltColorSpace undef } if
beginimage
FF000000FFFF0000FF0000FF00FF0000FF0000FFFF000000FF000000B369E300
1C964CE5000000E5E50000E50000E500E50000E50000E5E5000000E5000000BA
78E61A33A15FCC000000CCCC0000CC0000CC00CC0000CC0000CCCC000000CC00
0000C287E93349AB70B2000000B2B20000B20000B200B20000B20000B2B20000
00B2000000CA96EB4D61B6829900000099990000990000990099000099000099
9900000099000000D1A5EE6677C0947F0000007F7F00007F00007F007F00007F
00007F7F0000007F000000D9B4F1808ECBA6660000006666000066000066066
0000660000666600000066000000E0C3F499A4D5B84C0000004C4C00004C0000
4C004C00004C00004C4C0000004C000000E8D2F7B3BBE0CA3300000033330000
33000033003300003000033330000000330000000F0E1F9CCD2EADB190000019
1900001900001900190000190000191900000019000000F8F0FCE6E9F5ED0000
000000000000000000000000000000000000000000000000000FFFFFFFFFFFF
FF grestore end % Image Trailer grestore
grestore % Print PostScript grestore
...

%%BeginResource: procset AdobePS_Win_Compat 4. 2 0

10 scalefont setfont
```

IMAGE DATA TO FIG. 18

FIG. 19

```
%!PS-Adobe-3.0
%%Title: · · · · · · · · · · · · · · · · ·
%%Creator: · · · · · · · · · · · · · · ·
  ·

·

/TimesNewRoman findfont 15 scalefont setfont
150 150 moveto
(itagaki tomohisa) show
showpage
  ·

```
%!PS-Adobe-3.0
%%Title: · · · · · · · · · · · · · · · · ·
%%Creator: · · · · · · · · · · · · · · ·
  .

.

newpath
100 100 moveto
200 100 lineto
200 200 lineto
100 200 lineto
closepath
0.5 setgray fill
showpage
  .

.
```

IMAGE FORMING APPARATUS

BACKGROUND OF THE INVENTION

1. Field of the Invention

The present invention relates to an image forming apparatus utilizing an electrophotography system or an electrostatic recording system. More particularly, the present invention relates to an image forming apparatus such as a copying machine, a printer or a facsimile machine.

2. Description of Related Art

Some recent copying machines are used as a multi function printer (MFP) while connected to a network together with a printer or other apparatuses. Under such an environment, color matching of printed images among the apparatuses connected to the network or matching of the color of images displayed on a display device such as a CRT and the color of printed images is frequently performed. For that purpose, various color management techniques are known.

For example, in the case of color management using an international color consortium (ICC) profile, calibration (i.e. color matching, which is sometimes referred to as characterization) is performed by creating apparatus's own ICC profile for a printer or a copying machine etc., and print data is generated by performing color conversion based thereon using, for example, a personal computer (PC). Then, the print data is output to an apparatus that is adapted to that profile so that matching of color of printed images and the color of images displayed on a display device or the like is performed.

Since software for creating a profile and color measuring device are commercially available to general users, environments that allow general users to perform matching of the color output by an image forming apparatus such as a printer with desired color is gradually realized. In another calibration process that is presently used, color conversion of an ICC profile using multi-dimensional LUT is not performed, but desired gradation characteristics are obtained by modifying the content of a gamma LUT concerning gradation.

As per the above, color management is an effective technique in reducing difference in the output color among a plurality of apparatuses of the same type or different types, and its scope of application is not limited to the above-described situation. For example, it is being applied to the case in which a printer is used for the purpose of color calibration of printing performed by an offset printing machine by matching the color printed by the offset printing machine with the color printed by the printer. For example, color management as shown in FIG. 22 is made possible with an application software on a PC by preparing the ICC profile of the printing machine and the printer respectively.

As shown in FIG. 22, the content of an ICC profile for the printing machine 51 and the content of an ICC profile for the printer 52 are calibrated in relation to a color space that is not depends on the printing machine or the printer, such as, for example, the CIE L*a*b* color space, based on color measurement of a patch(es) using a calorimeter. Thus, the color printed by the printing machine and the color printed by the printer can be matched with each other. In addition, the color management module (CMM) 53 can create print data by performing color conversion using those profiles.

As per the above, with development of color management environment such as calorimeters, applications and softwares for creating a profile, use of an image forming apparatus using an electrophotography system for the purpose of color calibration of a printing machine is prevailing mainly in the field of designing.

On the other hand, color adjustment of the copying machine's engine is performed by means of the process in which a monochrome gradation patch is formed, density is calculated by a reader part, and a one-dimensional LUT (gradation correction table) with which a desired target (such as linearity in density or linearity in brightness etc.) can be realized, as disclosed in Japanese Patent Application Laid-Open No. 11-75067.

Furthermore, as described in Japanese Patent Application Laid-Open No. 2002-72577 or No. 2002-72574, stability of color can be realized, without requiring user's efforts, by forming a patch image on a transferring member, detecting and converting attached toner amount (or toner density) by means of a regular reflection sensor, and feeding it back to a LUT (a gradation correction table for correcting the gradation of images) or an ATR (toner replenishment amount in an apparatus for automatically controlling toner replenishment amount to a developing device).

By the way, in comparing the image quality of a general color copying machine and an offset printing machine, it turns out that the difference in resolution is large. The resolution of CTP for producing a plate of offset printing is at least 2400 dpi. On the other hand, the resolution of copying machines (or printers) using electrophotography system is 600 dpi on the average. Consequently, there is the problem that small point letters, proportion of letters and family as variations of fonts cannot be formed.

In addition, in the case that a dithering matrix is created in 600 dpi resolution in a copying machine, it is difficult to form a screen equivalent to that of a printing machine, since the number of control points is small.

As per the above, conventional color copying machines suffer from many problems concerning the resolution, and there is a demand by users for an increase in the resolution. On the other hand, the color copying machine is not always used for color comprehensive layout or as a proofer, but also for office use. Thus, an increase in the resolution involves problems that are common to all users, such as an increase in the cost of the apparatus or an increase in the processing time, and it is not appropriate to increase the resolution regardless of the situation.

In view of the above problems, there has been proposed an apparatus in which resolution can be switched while keeping the increase in the cost as low as possible to meet the needs of both types of users.

In the technology disclosed in Japanese Patent Application Laid-Open No. 59-221165, the dot density of electrostatic latent images formed on a photosensitive drum can be varied, and for that purpose, the frequency of a laser beam (namely, the frequency of a laser power modulation signal) or rotation speed of a polygon mirror are adapted to be changed.

Furthermore, in the technology disclosed in Japanese Patent Application Laid-Open No. 60-7263, upon laser beam pulse width modulation, the rising time of a pulse is controlled in accordance with the pulse width to adjust dot intervals so as to realize an increase in the resolution.

Still further, in the technology disclosed in Japanese Patent Application Laid-Open No. 60-182868, the resolution is switched by means of a so-called twin beam laser system.

In addition, in the technology disclosed in Japanese Patent Application Laid-Open NO. 2000-181275, the process speed in 1200 dpi resolution is designed to be half of the process speed in 600 dpi resolution so that switching between the user that requires high printing speeds but does not require high resolutions and the user that requires fine images can be realized.

However, there is the problem that an increase in the resolution invites instability in printed images.

For example, in view of the present optical technologies and costs, the limit of the laser spot diameter is approximately 35 μm. On the other hand, the pixel size in 600 dpi resolution and in 1200 dpi resolution is 42.3 μm and 21.1 μm respectively. In the former case, the laser spot diameter is smaller than the pixel size, but in the latter case, the laser spot diameter is larger than the pixel size. Therefore, sharp, deep and stable latent images cannot be formed in the latter case, and an instability factor arises due to overlapping of the outskirt portions of latent images. Furthermore, in other processes, a highly fine development technology or a highly efficient transferring technology etc. is required and there is a difference in stability between a low resolution printing and a high resolution printing.

Furthermore, stability is greatly related not only to the basic resolution but also to the screen line number serving as an image forming pattern in the case of area coverage modulation. Specifically, due to the problem of stability of latent images, it is difficult to ensure stability as the line number increases.

SUMMARY OF THE INVENTION

An object of the present invention is to provide an image forming apparatus in which it is possible to avoid deterioration of image quality even when the basic resolution of an image or the resolution of a portion having gradation in an image is changed.

Another object of the present invention is to provide an image forming apparatus in which it is possible to avoid deterioration of image quality while reducing time required for stabilization processing when the basic resolution of an image or the resolution of a portion having gradation in an image is changed.

A further object of the present invention is to provide an image forming apparatus in which it is possible to avoid deterioration of image quality while suppressing a decrease in durability of the image forming apparatus involved by stabilization processing, when the basic resolution of an image or the resolution of a portion having gradation in an image is changed.

A further object of the present invention is to provided an image forming apparatus comprising:
  image forming means for forming an image;
  switching means for switching resolution of an image formed by said image forming means;
  processing means for performing stabilization processing for stabilizing quality of the image formed by the image forming means; and
  changing means for changing a processing procedure of the stabilization processing in accordance with the resolution switched by the switching means.

Still further object of the present invention is to provide an image forming apparatus comprising:
  image forming means for forming an image;
  switching means for switching resolution of a portion having gradation included in the image formed by the image forming means;
  processing means for performing stabilization processing for stabilizing quality of the image formed by the image forming means; and
  changing means for changing a processing procedure of the stabilization processing in accordance with the resolution switched by the switching means.

Further objects and features of the present invention will become apparent from the following detailed description taken in conjunction with the accompanying drawings.

BRIEF DESCRIPTION OF THE DRAWINGS

FIG. 17 shows a PDL description of a bitmap image in embodiment 3.

FIG. 19 shows a PDL description of a text image in embodiment 3.

FIG. 20 shows a PDL description of a vector image in embodiment 3.

DESCRIPTION OF THE PREFERRED EMBODIMENTS

Figure 1:
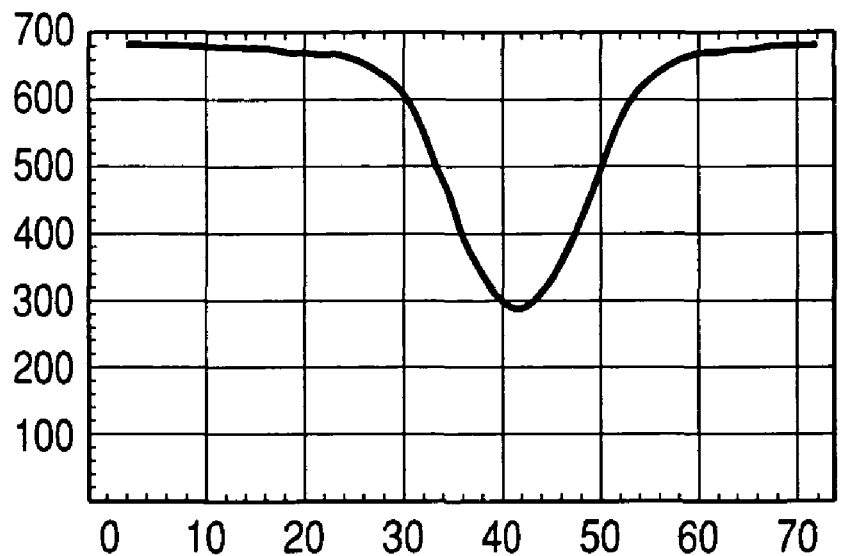
FIG. 1 is a conceptual drawing showing a latent image profile in 600 dpi resolution in embodiment 1.

In the following, embodiments of the present invention will be described with reference to the accompanying drawings. Throughout the drawings, elements designated by the same reference numerals have the same structure or function, and redundant description thereof will be omitted fitly.

Embodiment 1

Figure 2:
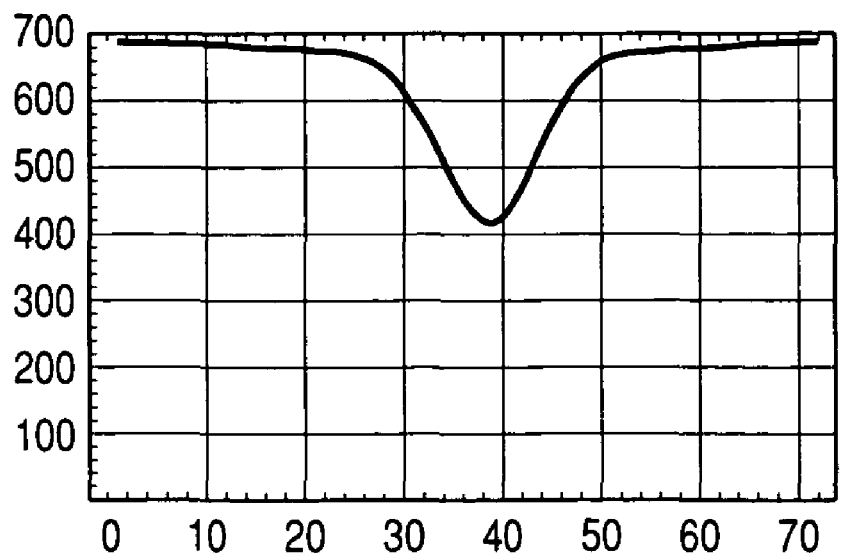
FIG. 2 is a conceptual drawing showing a latent image profile in 1200 dpi resolution in embodiment 1.

Stabilization Control Procedure in a Condition of Changing the Basic Resolution The laser beam referred to in this embodiment is a red laser beam. The diameter of the laser spot is 40 μm both in the main scanning direction and in the sub scanning direction. The shape of an latent image formed by such a laser spot is as shown in FIGS. 1 and 2. In connection with this, FIG. 1 and FIG. 2 show the latent image distribution in the case of an isolated dot pattern in 600 dpi resolution and in 1200 dpi resolution respectively, where the horizontal axis represents the coordinate position (μm) and the vertical axis represents the latent image potential (V).

Figure 3:
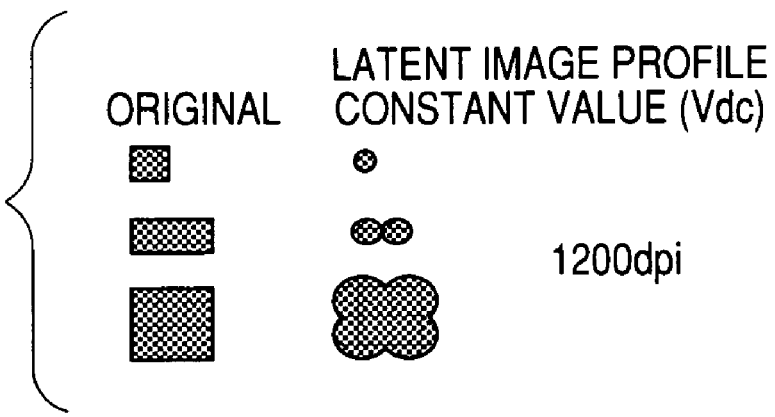
FIG. 3 is a conceptual drawing showing a toner image in 1200 dpi resolution in embodiment 1.
Figure 4:
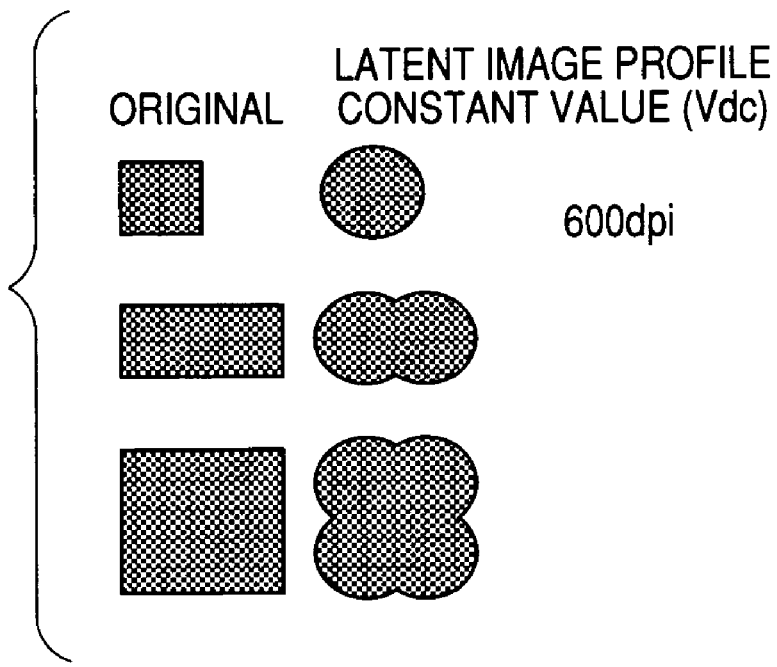
FIG. 4 is a conceptual drawing showing a toner image in 600 dpi resolution in embodiment 1.

As will be seen from these drawings, the isolated dot pattern in 1200 dpi resolution forms a latent image that is shallower than the latent image in 600 dpi resolution. In other words, the variation in the electric potential is smaller in the latent image in 1200 dpi resolution than that in 600 dpi resolution. Consequently, if it is assumed that the latent image is developed in the area defined by a certain developing bias potential (Vdc), the output result will be as shown in FIG. 3, wherein there occurs such a phenomenon that an isolated dot in the case of 1200 dpi resolution (the upper figure in FIG. 3) is not formed stably in the highlight portion and multiple dots (the middle and lower figures in FIG. 3) are stably formed. Namely, as shown in FIG. 3, an isolated dot is formed as an image quite different from the original image and only multiple dots are formed as an image similar to the original image. In FIG. 4, image formation with respect to an isolated dot (the upper figure) and multiple dots (the middle and lower figures) in 600 dpi resolution are shown.

As per the above, although image quality factors such as the proportion of letters and freedom of the dither matrix etc. can be enhanced with the increase in the resolution, density variation is likely to occur in the range from highlight to halftone in which unstable dots in 1200 dpi resolution are used.

Figure 5:
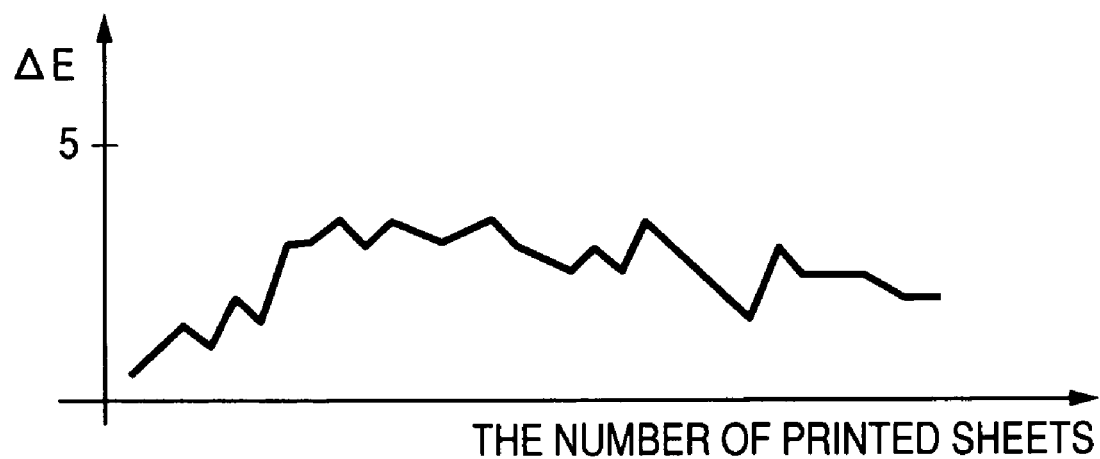
FIG. 5 is a graph showing relationship between the number of sheets during consecutive image forming (the number of printed sheets) and stability in 600 dpi resolution in embodiment 1.
Figure 6:
FIG. 6 is a graph showing relationship between the number of sheets during consecutive image forming (the number of printed sheets) and stability in 1200 dpi resolution in embodiment 1.

FIG. 5 shows the relationship between consecutive printing and stability in 600 dpi resolution. In addition, FIG. 6 shows the same relationship in 1200 dpi resolution. In FIGS. 5 and 6, the vertical axis ΔE represents color difference from the firstly printed sheet and the horizontal axis represents the number of consecutively printed sheets.

Figure 7:
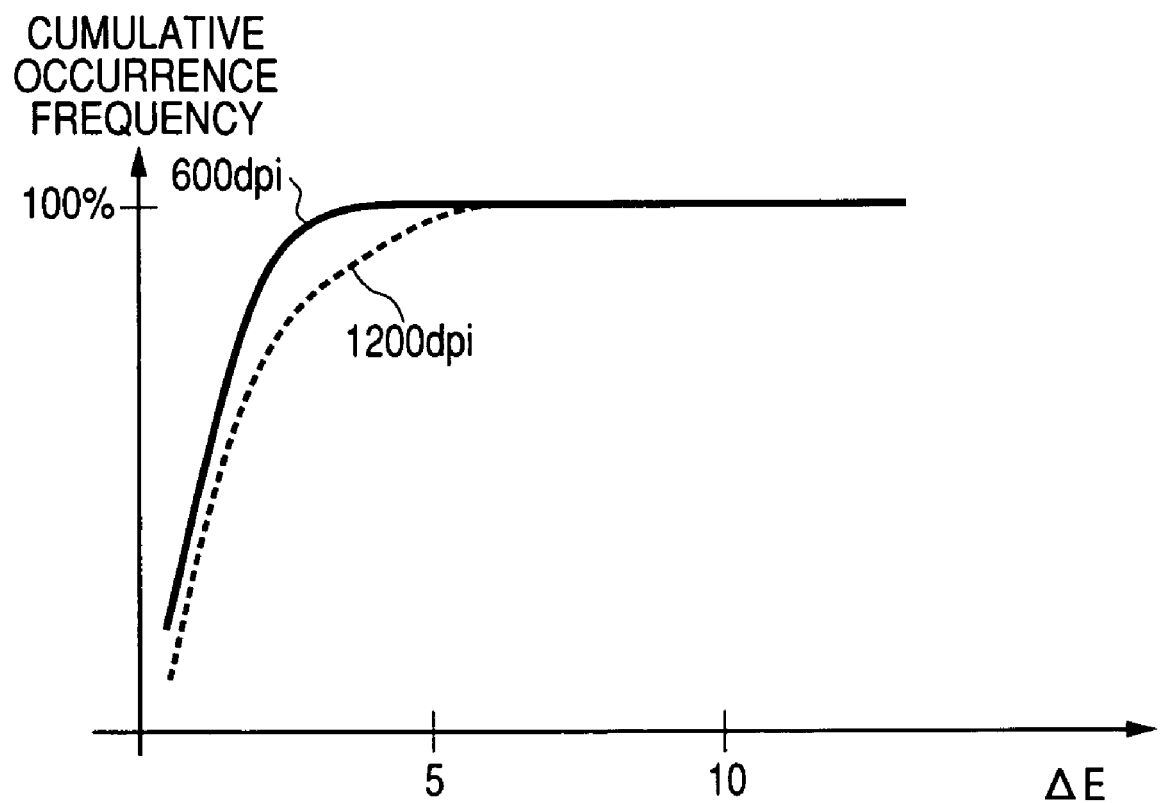
FIG. 7 is a graph showing an output result concerning stability under consecutive printing (color reproduction index) in embodiment 1.

As will be understood by comparing these graphs, stability during consecutive printing is low in the case of 1200 dpi resolution than in the case of 600 dpi resolution. These results are shown in FIG. 7 with the horizontal axis representing ΔE and the vertical axis representing cumulative occurrence frequency. By analyzing FIG. 7 from the viewpoint of color reproduction index, the following result is obtained.

The color reproduction index (occurrence possibility of ΔE≦10) was 93% in 600 dpi resolution and 87% in 1200 dpi resolution.

It follows from the above that in the image forming apparatus in which 600 dpi resolution and 1200 dpi resolution can be switched, it is necessary to make stability control more precise upon printing in 1200 dpi resolution.

(Description of Image Forming Apparatus)

Figure 8:
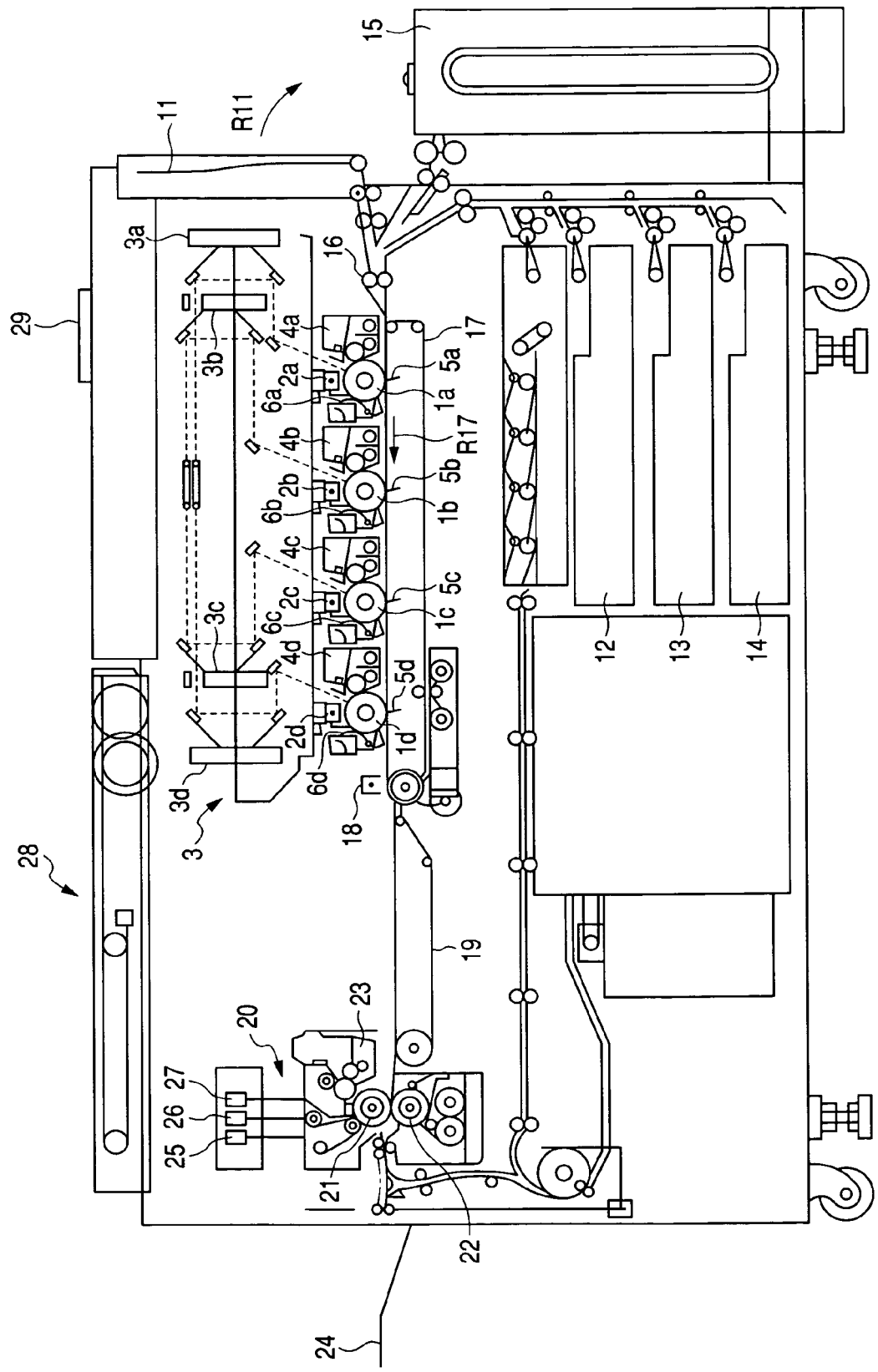
FIG. 8 is a vertical cross sectional view showing the basic structure of an image forming apparatus according to the present invention.

FIG. 8 shows an image forming apparatus according to embodiment 1 that exemplifies the image forming apparatus according to the present invention. The image forming apparatus shown in FIG. 8 is a four color process full color laser beam printer utilizing an electrophotography system. FIG. 8 is an vertical cross sectional view showing the basic structure of the apparatus.

The laser beam printer shown in FIG. 8 (which will be hereinafter referred to as an "image forming apparatus") is provided with four image forming stations for forming images of magenta, cyan, yellow and black respectively. Each image forming station has an electrophotographic photosensitive member (which will be hereinafter referred to as a "photosensitive drum") 1a, 1b, 1c, 1d serving as an image bearing member, which is supported in such a way as to be rotatable clockwise in FIG. 8. The photosensitive drum 1a, 1b, 1c, 1d is rotated at a predetermined process speed (or a peripheral velocity) in the counterclockwise direction in FIG. 8. In the periphery of the photosensitive drum 1a, 1b, 1c, 1d, there is provided a primary charger (charging means) 2a, 2b, 2c, 2d, an exposure apparatus (exposure means) 3a, 3b, 3c, 3d, a developing apparatus (developing means) 4a, 4b, 4c, 4d, a transferring charger (transferring means) 5a, 5b, 5c, 5d and a cleaning apparatus (cleaning means) 6a, 6b, 6c, 6d etc. basically in the mentioned order along the rotation direction of the photosensitive drum 1a, 1b, 1c, 1d. In the following descriptions, where the above-mentioned members or apparatuses are referred to collectively or where discrimination between colors is not necessary, they will be simply referred to in the manner like the photosensitive drum 1, the primary charger 2, the exposure apparatus 3, the developing apparatus 4, the transferring charger 5 and the cleaning apparatus 6.

Figure 9:
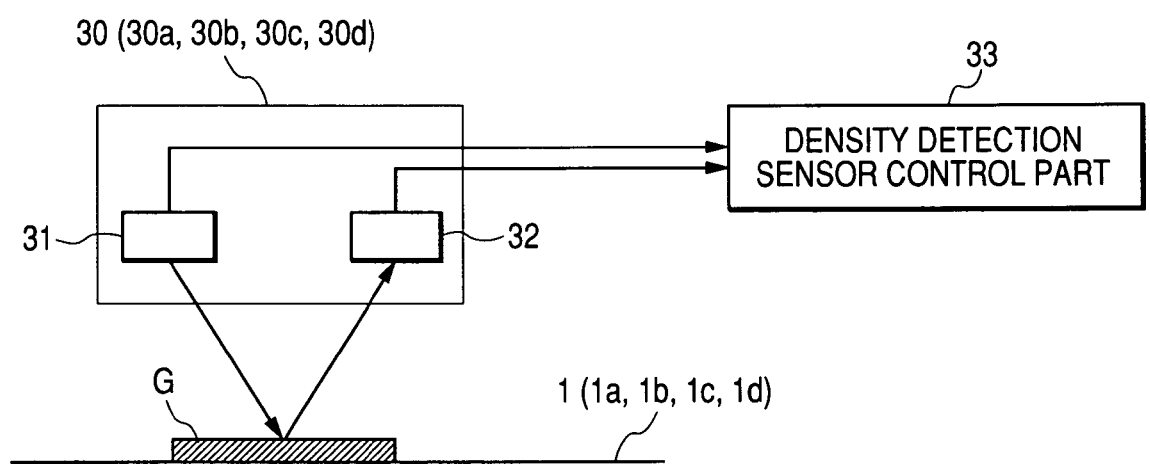
FIG. 9 is a diagram schematically showing a density detection sensor used in the present invention.

As shown in FIG. 9, in each of the image forming stations, there is provided a density detection sensor (density detection means) 30 (30a, 30b, 30c, 30d) in such a way as to be opposed to the photosensitive drum 1 (1a, 1b, 1c, 1d). The density detection sensor 30 is adapted to detect the toner amount of toner images formed on the photosensitive drum 1.

Between the developing apparatus 4a, 4b, 4c, 4d and the cleaning apparatus 6a, 6b, 6c, 6d and below the photosensitive drum 1a, 1b, 1c, 1d, there is provided a transferring belt 17 in such a way as to be in contact with the photosensitive drums 1a, 1b, 1c, 1d. The transferring belt 17 is adapted to rotate in the direction indicated by arrow R17 while bearing a recording material P such as a paper sheet or a transparent film serving as a recording medium, to convey the recording material P to the photosensitive drums 1a, 1b, 1c and 1d sequentially. Toner images formed on the photosensitive drums 1a, 1b, 1c and 1d in the respective image forming stations are sequentially transferred onto the recording material on the transferring belt 17 by means of the transferring chargers 5a, 5b, 5c and 5d.

The image forming apparatus is further equipped with a plurality of sheet feeding parts, namely, sheet feeding cassettes 12, 13 and 14, a manual sheet feeding tray 11 that can be drawn out in the direction indicated by arrow R11 in FIG. 8 and a large capacity paper deck 15. The recording material P is supplied onto the transferring belt 17 from one of those sheet feeding parts by means of feed rollers, conveying rollers and registration rollers 16.

While the recording material P supported on the transferring belt 17 passes through each of the image forming stations, toner images of the respective colors formed on the photosensitive drums 1a, 1b, 1c and 1d are sequentially transferred onto the recording material P. After this transferring process is completed, the recording material P is detached from the transferring belt by means of a detach charger 18, and then conveyed to a fixing apparatus 20 by a convey belt 19 serving as recording material guiding means.

The fixing apparatus 20 is provided with a fixing roller 21 that is supported rotatably, a pressure roller 22 that is adapted to rotate while pressed against the fixing roller 21, a release agent application means 23 serving as release agent supply and application means and a roller cleaning apparatus. In the interior of each of the fixing roller 21 and the pressure roller 22, there is provided a heater (not shown) such as a halogen lamp. Thermistors (not shown) that are in contact with the fixing roller 21 and the pressure roller 22 respectively are provided, so that the surface temperature of the fixing roller 21 and the pressure roller 22 is adjusted by controlling the voltage applied to the respective heaters by means of a temperature adjusting apparatus (not shown). The pressure applied by the pressure roller 22 and the surface temperature of the fixing roller 21 can be varied by a fixation control mechanism 25.

The release agent application means 23 for applying silicone oil as a release agent to the surface of the fixing roller 21 is in contact with the fixing roller 21 so that toner will not adhere to surface of the fixing roller when the recording material conveyed by the convey belt 19 passes between the fixing roller 21 and the pressure roller 22. The release agent application means 23 is connected with an application amount control apparatus 26 that controls the amount of the silicone oil applied to the surface of the fixing roller 21.

A speed control apparatus 27 for controlling the conveyance speed of the recording material P, namely, the rotation speed of the fixing roller 21 and the pressure roller, which presses and heats the both sides of the recording material, is connected to a driving motor for driving the fixing roller 21 and the pressure roller 22. Thus, the unfixed toner image on the surface of the recording material P is melted and fixed, so that a full color image is formed on the recording material P. The recording material P on which the full color image has been formed is separated from the pressure roller 22 by a separation claw (not shown) and discharged onto a discharge tray 24.

In the upper portion of the image forming apparatus shown in FIG. 8, there is provided a original reading part 28 and an operation display 29. The original recording part 28 reads an original placed on a copy board (not shown) by optical scanning to create image signals of the respective colors. The operation display 29 is used for command entry by an operator (i.e. a user or a service person) or informing the operator of the status of the apparatus etc. Switching of the resolution upon copying operation (which will be described below) is indicated by this operation part.

(Method of Switching the Resolution)

In this embodiment, switching of the resolution is attained by reducing the process speed to half as described, for example, in Japanese Patent Application Laid-Open No. 2000-181275. More specifically, in 600 dpi resolution, the process speed is set to 200 mm/sec, while in 1200 dpi resolution, the process speed is set to 100 mm/sec and the number of printed sheets per one minute is also reduced to half.

Recently, many printer manufacturers attain an increase in the resolution by reducing the process speed to half. In this embodiment also, this method is adopted, since it does not requires significant modification of parts and it is advantageous from the viewpoint of cost.

(Stabilization Control)

Next, stabilization control will be described.

A characterizing feature of the stabilization control method in the present invention is that the stabilization control method is changed between in 600 dpi resolution and in the 1200 dpi resolution. As described in the description of the related art, the higher the resolution is, the higher stability is required to be ensured. In the following, description will be made centering on the control process that is changed with switching of the resolution.

(Density Detection Sensor)

As shown in FIG. 9, the density detection sensor 30 (30a, 30b, 30c, 30d) is provided with paired light emitting element 31 and light receiving element 32 functioning as an optical sensor. Light emitted from the light emitting element 31 is reflected by the surface of a patch image G (i.e. a toner image used for density detection) formed on the photosensitive drum 1 (1a, 1b, 1c, 1d), and the reflected light is received by the light receiving element 32. A received light signal generated from the light receiving element 32 is input to a density detection sensor control part 33. Then, the density is calculated from the received light signal based on a relationship between the received light signal and the density that has been calculated and organized into a table in advance.

Although stabilization control includes a partly manual control and a full automatic control (here, operator's requirement for switching the resolution, which will be described later, is included in the automatic control), it should be understood what is referred to as the stabilization control is the automatic control, in connection with this invention.

(Reader Gradation Correction)

Firstly, there is a process related to automatic gradation correction, which is calibration performed by the user before important printing. In this process, a plurality of gradation patches without a look up table (LUT: gradation correction table) are output on a recording material P, then the recording material P is placed on the reader part by the user so that the gradation patches are read by a CCD for conversion into the density. Thus, it is determined how the printed image density is like in relation to the input signal so as to automatically correct the gradation (i.e. the LUT is updated) in such a way that a predetermined target is realized.

(Engine Gradation Correction)

Secondly, the flow on the recording material P is performed automatically within the main body of the image forming apparatus to enhance the usability. It is not realistic for users to perform the stabilization control of the recording material P everyday. The users' need is full automatization of the above described automatic gradation correction on the sheet, which is actually realized in many image forming apparatuses.

Specifically, a gradation patch image without a LUT is formed on the photosensitive drum 1 at a certain timing. This gradation patch image is detected by the density detection sensor 30 and converted into density, and a LUT or a table for correcting gradation in such a way as to realize a predetermined target is updated. The aforementioned certain timing is after turning-on of the power, after the front door is opened or closed, after a predetermined number of times of printing is performed, or at the time when a variation in a environmental condition occurs etc.

The above-described two types of control have been known for their stabilization ability for individual job, but they do not assure stability during consecutive jobs. During the consecutive jobs, it is difficult to ensure stability due to variations in properties of the toner in the developing apparatus 4. In such a case, a patch image is formed in an interval of the consecutive jobs, namely, between the sheets (i.e. the interval between the trailing edge of a preceding recording material P and the leading edge of the following recording material P) so that a LUT is corrected.

(Real Time Gradation Correction)

Figure 10:
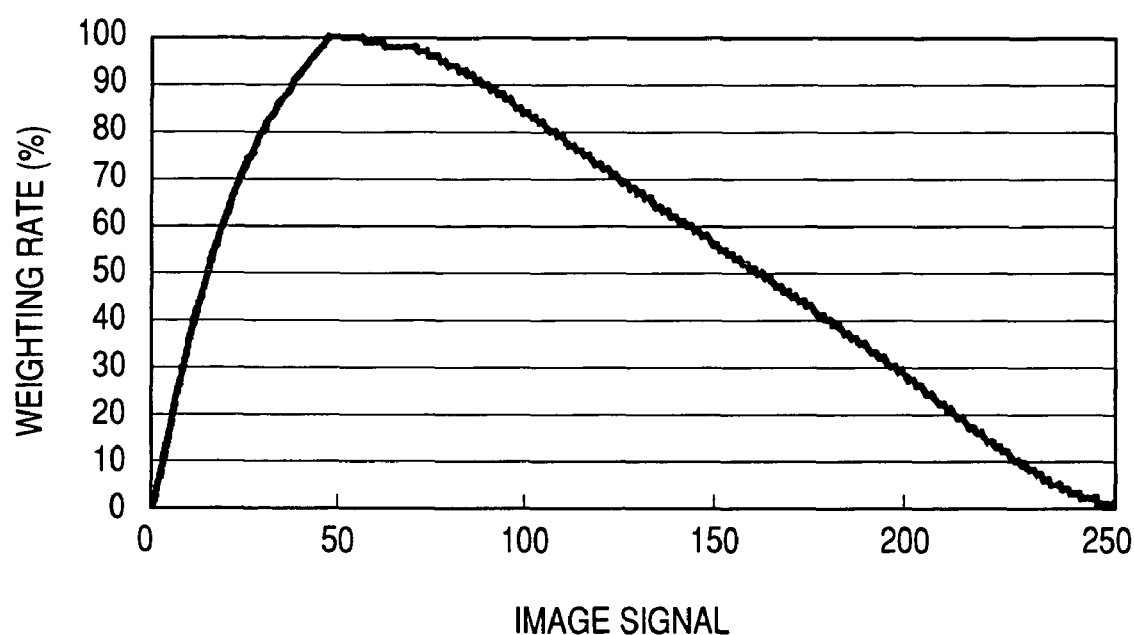
FIG. 10 shows a real time gradation correction table used in the present invention.

More specifically, a halftone patch image using a LUT is formed on the photosensitive drum 1, and whether a prescribed density is obtained or not is checked. If the prescribed density is not obtained, the gradation correction (which will be referred to as a "real time gradation correction table")

shown in FIG. 10 is registered before the LUT. Specifically, it is assumed here that a gradation represented by 30H (i.e. 48 in the decimal system) in the gradation range of 0 to FFH (i.e. 255 in the decimal system) is formed on the photosensitive drum 1 and its prescribed density is 0.3. Under this assumption, if the measured density value is 0.2, the value is smaller than the prescribed value by 0.1. In this case, an increase amount corresponding to 0.1 is added to the part of 30H. As to the other parts, increase/decrease amount is controlled in accordance with the variation of 30H. In the other gradations, the gradation correction is performed while varying correction amount for each signal level based on the table presented in FIG. 10 in such a way that variation correction amount at the gradation corresponding to 30H is 100% in density value, the correction amount at the gradation corresponding to 20H is 84%, and so on. In doing so, since deterioration of stability matters in the range from highlight to halftone, the patch that constitutes the image is appropriately arranged so that the 30H and highlight area is correctly adjusted. In addition, from the viewpoint of visual sensitivity, variations in the highlight to halftone area is more visible than variations in the shadow area. Therefore more improved stability is desired in the former area. In view of these facts, greater importance is given to the highlight to halftone area in the patch formation and the control process. In this control process, it is preferable that a patch image having a density lower than the midpoint of the highest density and the lowest density be formed upon control.

As the flow of the image signal, it is necessary to perform a conventional LUT process after the image signal has passed through the above-described gradation correction table. However, the above-described real time gradation correction table and the LUT may be made into one LUT.

With the above-described control, it is possible to perform the real time gradation correction in which the LUT is corrected using one patch image during consecutive jobs to serve the correction of printing of the next page.

This embodiment is characterized by that the control process intervals of the above-described real time gradation correction during consecutive jobs are varied between 1200 dpi resolution and 600 dpi resolution. In 600 dpi resolution, the control process is performed every 10 sheets, while in 1200 dpi resolution, the control process is performed every 5 sheets in order to enhance accuracy.

As per the above, it is possible to reduce the time required for stabilization control as much as possible by changing the intervals of the stabilization control in accordance with switching of the resolution. Consequently, it is possible to decrease a so-called down time in which the image forming apparatus cannot perform normal image formation. In other words, the time required for stabilization control can be reduced as much as possible. Thus, it is possible to improve the throughput (i.e. the maximum number of times of image formation that can be performed per unit time) in normal image formation.

In addition, by changing the intervals of the stabilization control in accordance with switching of the resolution, it is possible to avoid a decrease in durability of the above-described image forming devices in the image forming apparatus that might be otherwise caused by stabilization control performed by forming patch images.

(Description of Image Processing Part)

Figure 11:
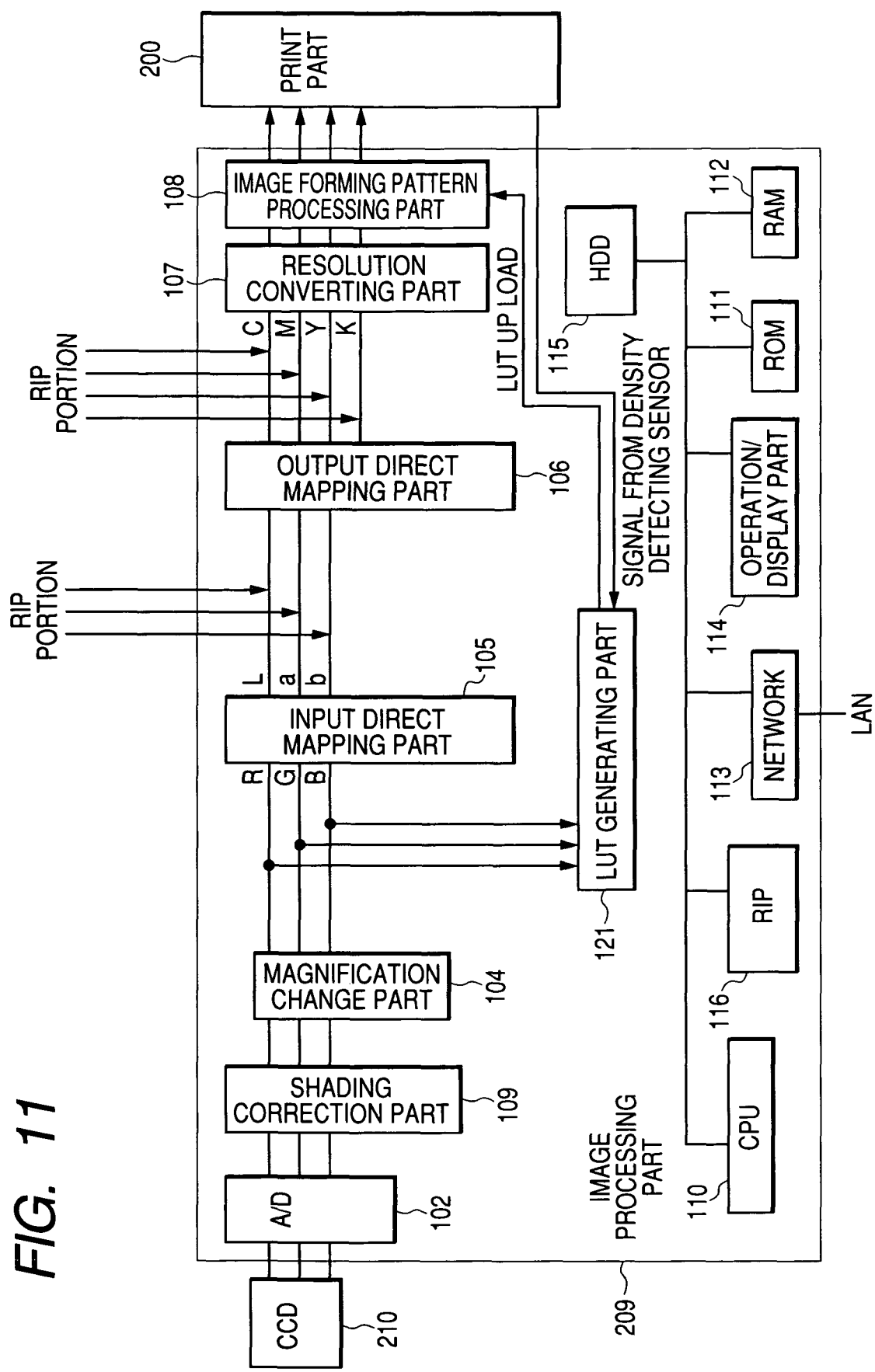
FIG. 11 is a block diagram showing the constitution of an image processing part in embodiment 1.

Next, the constitution of the image processing part 209 will be described. FIG. 11 is a block diagram showing the outline of an exemplary constitution of the image forming part 209.

A CCD 210 shown in FIG. 11 is adapted to read an original image with a resolution of 600 dpi and output the read image to the image processing part 209 as RGB signals. The RGB signals input to the image processing part 209 are converted into digital RGB signals by means of an A/D converter 102. A shading correction part 103 is adapted to correct unevenness in illumination light quantity, unevenness in light quantity generated in the lens optical system and unevenness in the sensitivity of the pixels of the CCD 210. A magnification change part 104 is adapted to enlarge/reduce the size of read images.

An input direct mapping portion 105 has a multi-dimensional LUT close to ICC profiles to convert the RGB signals into L*a*b* signals which are independent from devices. An output direct mapping portion 106 is adapted to convert the L*a*b* signals into regular CMYK signals. A resolution converting part 107 is adapted to convert reader information of 600 dpi into 1200 dpi as need arises. In the case of a printout signal, conversion is performed based on information set by the user.

An image forming pattern processing part 108 has a value multiplexing function by line growth dithering or dot concentration dithering (methods disclosed in Japanese Patent Application Laid-Open No. 11-17947) for 600 dpi and 1200 dpi, and image forming pattern is selected under control of a CPU 110. Each of the CMYK signals output from the image forming pattern processing part 108 is sent to a printer part 200. In addition, processing using a LUT for correcting the gamma characteristic of the printer part 200 is also performed in the image forming pattern processing part 108. The LUT is prepared for each resolution and each image forming pattern. It is normal that the LUT processing is basically performed before pattern processing such as matrix calculation etc. The LUTs in the image forming pattern processing portion 108 are adapted to be updated by a command from the CPU 110. LUTs created upon the reader gradation correction, the engine gradation correction and the real time gradation correction during consecutive printing are generated by a LUT generating part 121 and sent to the image forming pattern processing part 108, in which they are updated.

The RGB signals from the reader part and the signal from the density detection sensor 30 in the interior of the image forming apparatus are sent to the LUT generating part 121. The function of the LUT generating part 121 is to convert the input RGB information and the input information from the density detection sensor 30 into respective density signals and to generate a LUT for correcting the gradation in such a way that a desired target is realized with respect to the relationship between the output patch signal information and the density information that has undergone density conversion. The LUT thus generated can be uploaded to the image forming pattern processing part 108.

The CPU 110 performs overall control of every portion of the image processing part 209 based on a control program stored in a ROM 111 while using an RAM as a work memory. The CPU 110 also performs control for setting parameters for, for example, the resolution converting part 107 and the image forming pattern processing part 108. As the processing means, the CPU 110 controls an operation/display part 114 and a network I/F 113 to input/output image information and device information. As per the above, the CPU 110 is a processor that controls the overall system.

HDD 115 is a hard disk drive in which a system software, normal image data and image data that have already been output are stored (setting can be made by users). In addition, it also functions to transmit information entered by the user of the system through the operation/display part 114 to the CPU. A raster image processor (RIP) 116 functions to develop a PDL code into a bitmap image and send L*a*b* signals or CMYK signals to the upstream and the downstream of the output direct mapping part 106.

(Description of Flow Chart)

Figure 12:
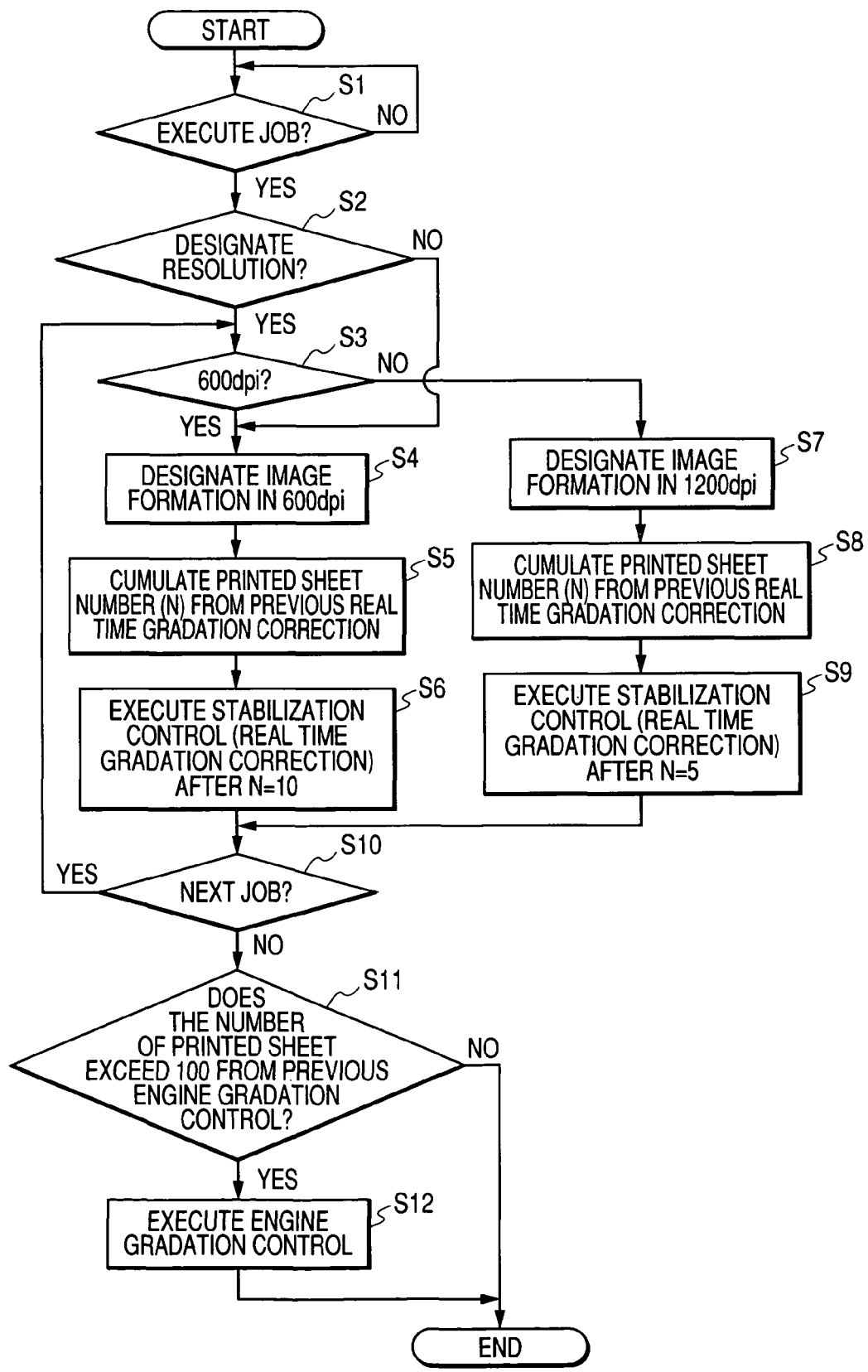
FIG. 12 is a flow chart of a control process in embodiment 1.

FIG. 12 shows the flow of a process executed when a command of resolution switching output is entered by the user, which constitutes a characterizing feature of this embodiment.

When the designation of resolution switching output is entered, the image forming apparatus makes a determination on the resolution designated by the user through the operation/display part 114 or on a printer driver, namely, the image forming apparatus determines whether it is 600 dpi printing or 1200 dpi printing by means of the CPU (S1, S2).

In connection with this, in the case of 600 dpi (i.e. answered "Yes" in S3), the CPU controls to execute the real time gradation control every 10 sheets (S4, S5, S6) and in the case of 1200 dpi (i.e. answered "No" in S3), the CPU controls to execute the real time gradation control every 5 sheets.

In this embodiment, in order to enhance productivity, the image formation is not terminated if the next job is present (i.e. answered "Yes" in S10), and the process returns to step S3 so that the operation of image formation sequence like in the consecutive image printing is performed. Therefore, it is determined how many times of image formation have been performed since the latest real time gradation correction was executed irrespective of whether a plurality of images are printed consecutively or not, and the real time gradation correction is performed every 10 sheets in the case of 600 dpi, and every 5 sheets in the case of 1200 dpi.

In the case that the next job is not present (i.e. answered "No" in S10), it is determined how many times of image formation have been performed since the latest real time gradation correction was performed (specifically, whether the number of the printed sheets exceeds 100, in FIG. 12), and the real time gradation control is performed as circumstances demand (S11, S12) in preparation for the next image formation.

As per the above, it is possible to avoid deterioration of gradation of images (or instability in the image quality) caused by image density defects involved by switching of the resolution, by changing the above-described stabilization control fitly. Thus, it is possible to ensure for the user to obtain printing with a resolution as high as 1200 dpi and stability equivalent to that in 600 dpi resolution, and therefore it is possible to provide an image forming apparatus that accommodates various users' needs at a low price.

Embodiment 2

Switching of Stabilization Control in Accordance with the Number of Lines in Screen A characterizing feature of embodiment 2 resides in that the determination of switching of the resolution used in embodiment 1 is applied to the screen line number.

In the printing industry, the number of lines is varied in accordance with the types of printing, for example 105 lines/inch (which will be abbreviated as "lpi" hereinafter; the value indicating how many lines are present per one inch and sometimes referred to as line number or screen resolution) for newspaper printing, 133 to 150 lpi for printing on high quality paper as the recording material P, 150 to 200 dpi for art paper or coated paper, and 300 lpi for gravure printing etc.

Today's color copying machines used for outputting a color comprehensive layout or a proof is designed to be able to switch the line number so that they can accommodate such outputs. That is so-called halftone dot simulation.

Figure 13:
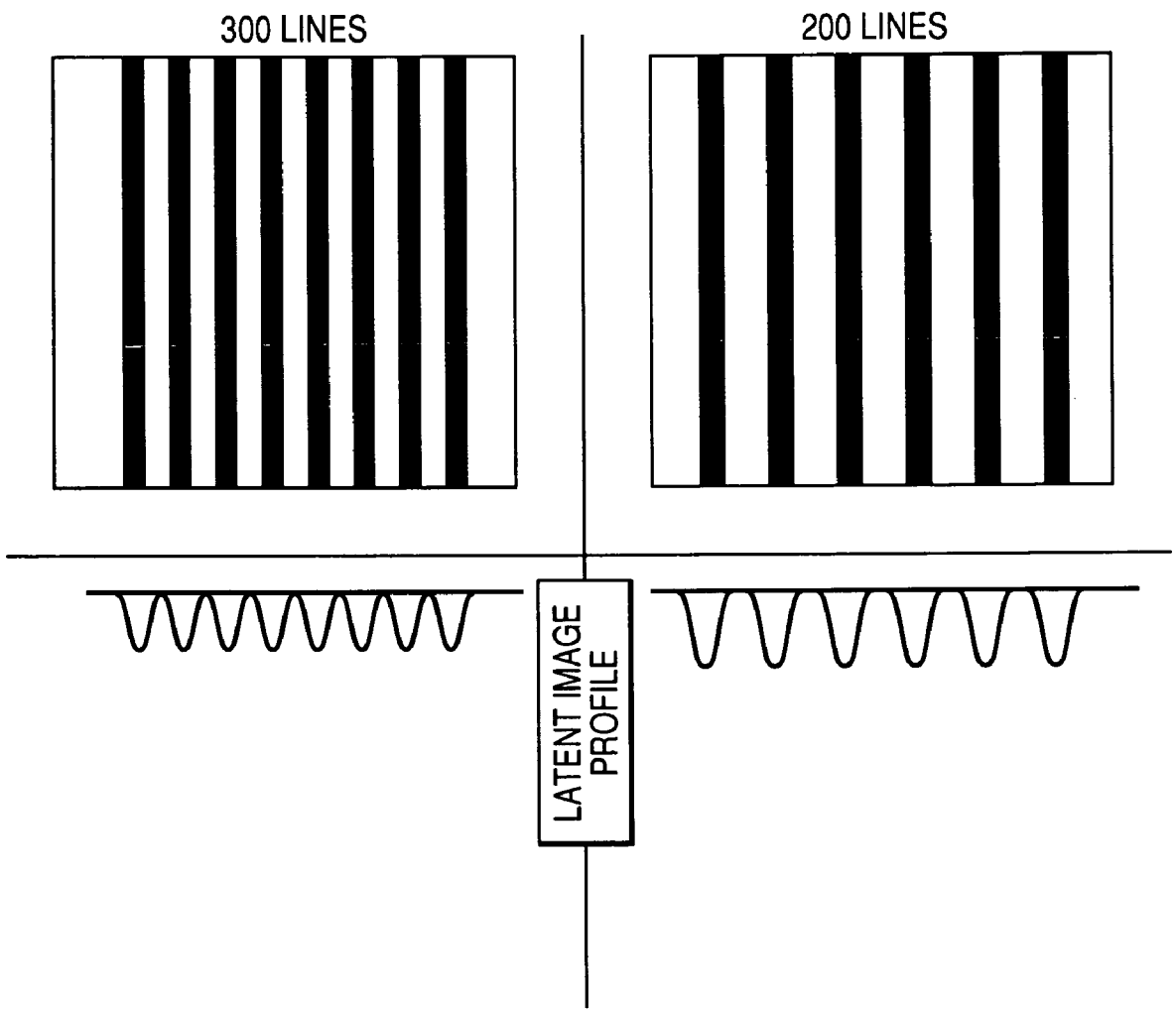
FIG. 13 is a conceptual drawing showing latent image profiles having different line numbers in embodiment 2.

As is the case with embodiment 1, with an increase in the screen line number, it is difficult to ensure stability. FIG. 13 shows latent images under the condition that patterns having the same area rate are output. It will be understood that fine dots cannot be formed stably as is the case with embodiment 1.

Hence, this embodiment is characterized by that stabilization control procedure is changed when a screen line number switching output is commanded.

(Screen Line Number in this Embodiment)

In this embodiment, screens of 133 and 166 lines intended to be used for printing on high quality paper, 200 lines intended to be used for high grade printing and 268 lines optimized for literal fine images are prepared.

Although 268 lines are prepared in order to reduce jaggy in the characters or to be used for CAD drawings, the control process is the same as that in the case of 166 lines, since skin color including memory color or process black is small and it is not necessary to perform stabilization control at the expense of toner consumption amount and the lifespan of various parts.

The relationship between the screen line number and the stabilization control performed in this embodiment will be presented in the following.

133 lines: once per every 15 sheets,
166 lines: once per every 10 sheets,
200 lines: once per every 5 sheets,
268 lines: once per every 10 sheets.

Needless to say, LUTs are prepared separately for the respective line numbers mentioned above, and patch images corresponding to them are formed in the real time gradation correction.

There is no substantial change in the structure of the image forming apparatus, the density detection sensor and the image processing part, and so the description thereof will be omitted. However, the resolution converting part 107 shown in FIG. 11 is not provided in this embodiment.

(Flow Chart)

Figure 14:
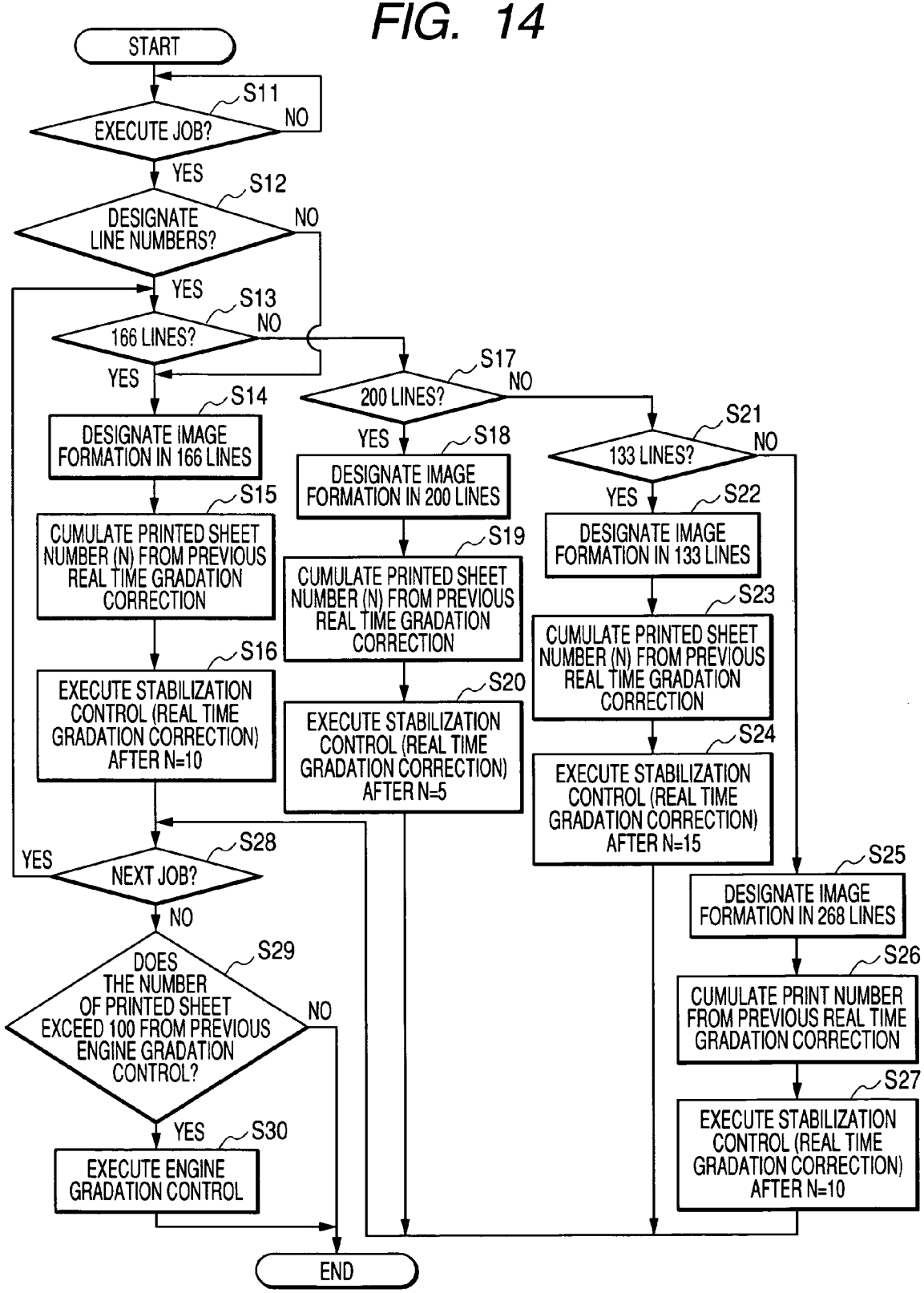
FIG. 14 is a flow chart showing a control process in embodiment 2.

FIG. 14 shows a flow of a process executed when the screen line number is designated by the user, which constitutes a characterizing feature of this embodiment.

When a command for printing is received, the image forming apparatus makes a determination (S11, S12) on the screen line number designated by the user through the operation/display part 114 (see FIG. 11) or on a printer driver, namely, the image forming apparatus determines whether the screen line number is 133 lines, 166 lines, 200 lines or 268 lines (S13, S17, S21).

In connection with this, in the case of 133 lines (i.e. answered "Yes" in S21), the real time gradation control is executed every 15 sheets (S22, S23, S24), in the case of 166 lines (i.e. answered "Yes" in S13), the real time gradation control is executed every 10 sheets (S14, S15, S16), in the case of 200 lines (i.e. answered "Yes" in S17), the real time gradation control is executed every 5 sheets (S18, S19, S20) and in the case of 268 lines (i.e. answered "No" in S21), the real time gradation control is executed every 10 sheets (S25, S26, S27).

Then, if the next job is present (i.e. answered "Yes" in S28), the process returns to step S13. On the other hand, if the next job is not present (i.e. answered "No" in S28), the process proceeds to step S29. Then, in the case that the number of printed sheets since the last engine gradation control does not exceed 100 (i.e. answered "No" in S 29), the process is terminated, while in the case that the number of printed sheets exceeds 100 (i.e. answered "Yes" in S29), engine gradation control is executed (S30) and the process is terminated.

As has been described in the forgoing, it is possible to eliminate instability of printing caused by switching of the screen line number by changing stabilization control process. Thus, since stability is ensured even in high line number printing, the apparatus can be used not only for the purpose of color comprehensive layout but also for proof printing equivalent to color calibration of printing machines, and use application can be expanded for users.

Embodiment 3

The Case in which Multiple Processing Patterns are Present on a Surface

In embodiment 3, a description will be made of stabilization control method in the case in which multiple processing patterns (or image forming patterns) are present on a surface, namely in the case in which text information, vector information and bitmap information are present utilizing tag bits.

The description of the above embodiment 2 was directed to the case in which the screen line number is constant throughout the surface. However, when desktop publishing (DPT) is taken into consideration, there are various objects including text information used for headlines or descriptions, vector information represented by boxes or circles and bitmap information such as photographic images etc.

In recent image processing apparatuses, such information is analyzed through the page description language (PDL), so that processing optimum to each object is effected.

For example, as described in connection with embodiment 2, since letters or the like are constituted by not only straight lines but also many curves lines, jaggy will be conspicuous unless the line number is not made high.

On the other hand, in the case of photographic images, if the line number is made high, not only stability in the color but also graniness is deteriorated due to instable factors of latent images. Therefore, the screen line number is made lower for photographic images than for letters.

In such an image forming apparatus in which processing is automatically determined to select screen processing, it is impossible to determine which processing is taken into account for stabilization control.

In addition, stabilization control with a fixed line number does not works adequately, since there are image forming apparatuses in which the line number is automatically switched in accordance with the aforementioned objects or image forming apparatus in which the line number can be manually designated.

This embodiment is intended to eliminate the above problems and characterized by that only the line number for printing bitmap images such as photographic images is considered as the line number based on which real time gradation correction is to be performed.

(Image Processing Part)

Figure 15:
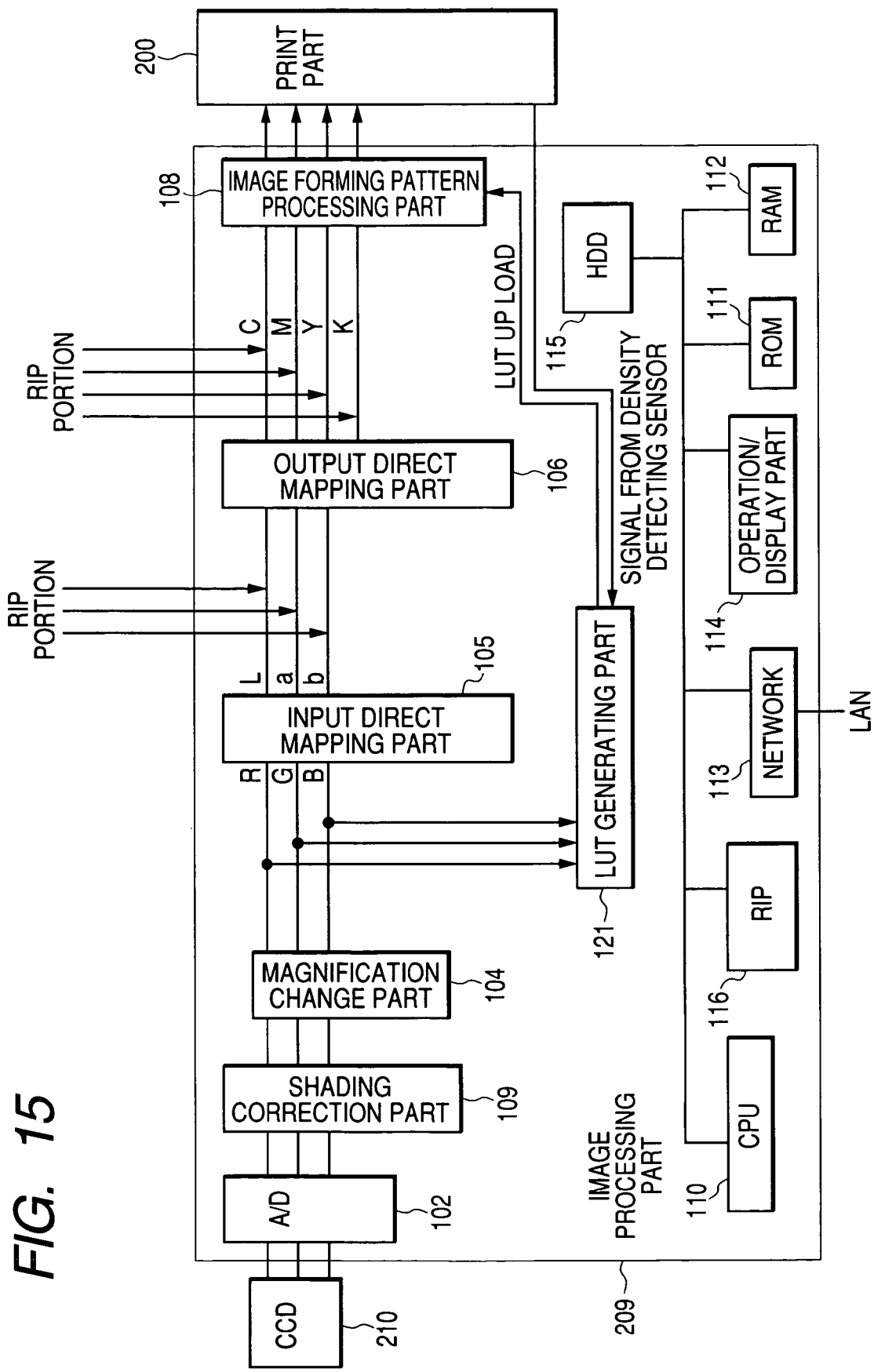
FIG. 15 is a block diagram showing the constitution of an image processing part in embodiment 3.

FIG. 15 shows the outlines of the image processing part in embodiment 3.

Figure 16:
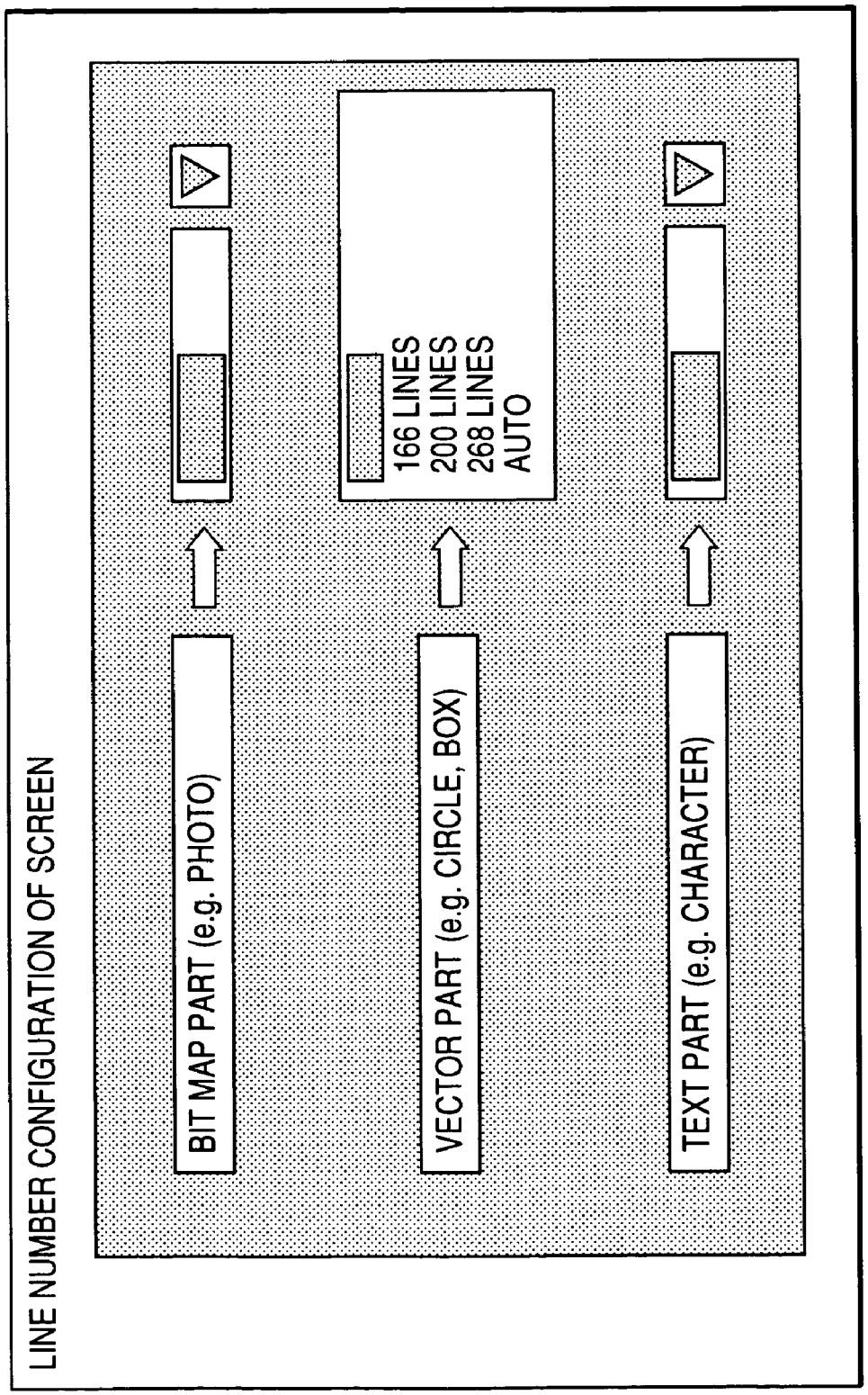
FIG. 16 schematically shows user's designation of an image forming pattern in embodiment 3.

In embodiment 3, since conversion of the basic resolution is not effected as is the case with embodiment 2, the resolution converting part 107 that is present in embodiment 1 is omitted. In addition, as in the internal function of the RIP part 116 for analyzing PDL information to develop it into a bitmap image, automatically allotting function as follows is built in, and an arrangement for sending a command to the image forming pattern processing part 108 is provided. In addition, as shown in FIG. 16, it is possible for the user to effect designation of line number. Thus, the RIP part 116 sends a command to the image forming pattern processing part 108 based on the designated information.

Text: 268 lines
Vector: 200 lines
Bitmap: 166 lines

On the other hand, determination of the object in the RIP part 116 is performed based on description of the PDL as follows.

Figure 18:
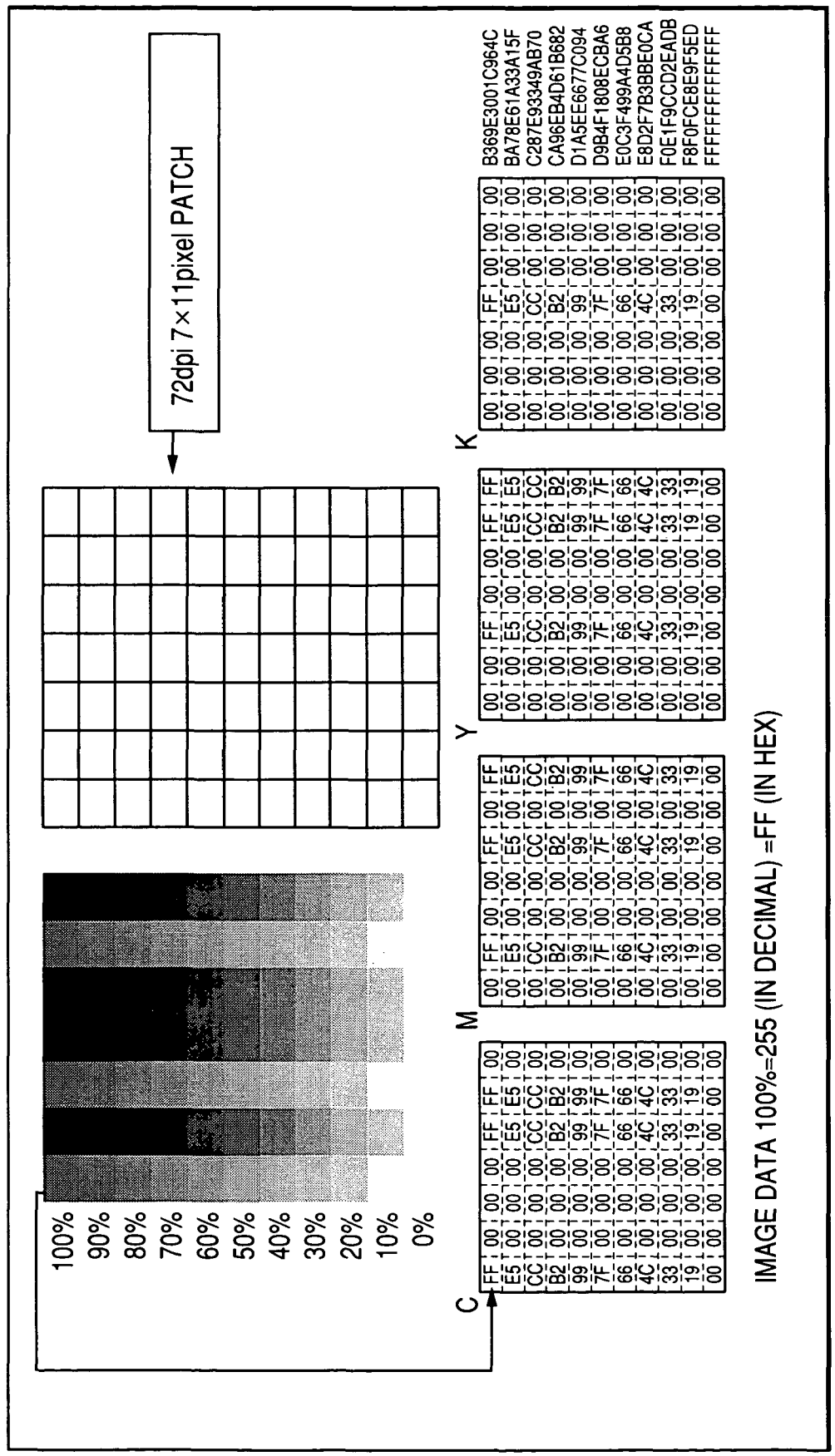
FIG. 18 illustrates the structure of a bitmap image in embodiment 3.

FIG. 17 shows a PDL form (post script language) upon commanding printing of an image file. This example is directed to a case in which an CMYK image is printed as an image of 7×11 pixels at a resolution of 72 dpi with an application software Photoshop. In the image file, a image data value is descried for each of the pixels (see FIG. 18), and therefore, determination on inclusion of a photographic image may be made based on this information. On the other hand, FIG. 19 shows the content of a post script file in a case in which a simple letters are printed.

In this example, "/TimesNewRoman" is a font name, "findfont" functions to search the aforementioned font in a HDD or a ROM connected to the image forming apparatus, "15 scalefont" is a command for magnifying the found font 15 times or set the size of the font to 15 point (fonts are registered at 1 point), and "setfont" is a command for registering the font created in the aforementioned flow.

Furthermore, "150 150 moveto" is a command for performing writing at a position of (150, 150) points (one point is ½ inch), where the original point (0, 0) is set at the bottom left corner, "(itagaki tomohisa)" is the letters actually output, "show" is a command for performing drawing, and with "showpage" an actual outputting operation is performed.

As per the above, the RIP part 116 is adapted to analyze PDL codes as shown in FIG. 19 to determine the coordinates of literal information.

Contrary to picture images, vector images are drawn based on descriptions as mathematical formula, coordinates or codes, and information amount for vector images can be made smaller than bitmap images, for which it is necessary to describe color information for every pixel.

FIG. 20 shows a PDL description for a square image. In this description, "newpath" is a declaration of formation of a new path, and "moveto" designates the initial position. The numerical values "100 100" designate a coordinate position, that is, a position shifted by 100 points in X direction and 100 points in Y direction from the reference position at the bottom left corner. Here, one point is ½ inch. Furthermore, "lineto" is a code for drawing a movement trajectory, namely, a movement trajectory or a line from (100 100) to (200 200) is formed. Similarly, movement is performed to the position of the remaining two points to draw lines. Then, with "closepath", a line is drawn between the starting point and the end point, and with "fill", the area is filled. The color designation upon filling is 50% gray. Finally, with "show page", an outputting operation is performed in a manner similar to in the case of texts.

Thus, determination of vector images may be made based on the codes such as "closepath", "lineto" or "fill".

As per the above, analysis of the PDL is performed to determine object categories and areas, and information thereon is sent to the image forming pattern processing part 108.

(Flow Chart)

Figure 21:
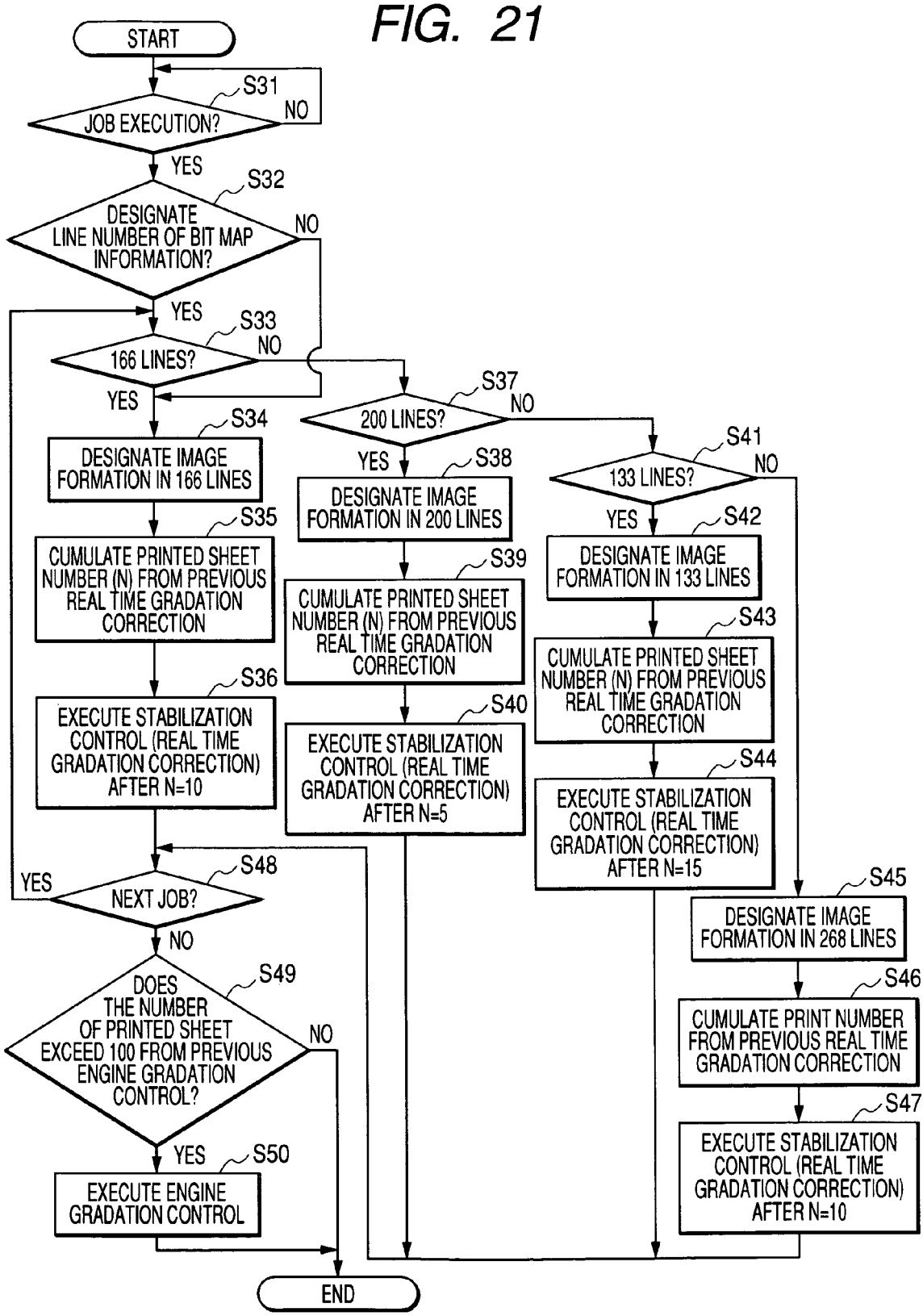
FIG. 21 is a flow chart of a control process in embodiment 3.
Figure 22:
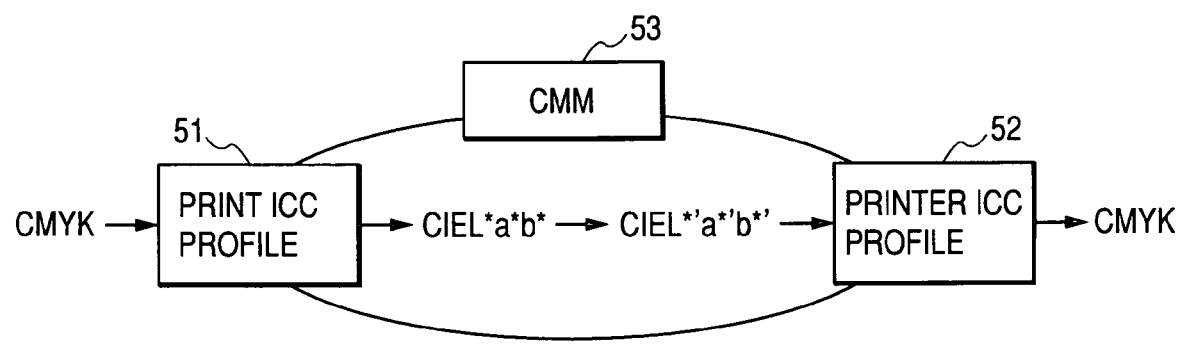
FIG. 22 is a diagram showing a color management flow in a prior art.

In the following, real time gradation control in the case that tag bits are used will be described with reference to FIG. 21.

When a command for printing is received, the image forming apparatus makes a determination (S31, S32) on the screen line number of the bitmap portion (i.e. the photography portion) designated by the user through the operation/display part 114 (see FIG. 15) or on a printer driver, namely, the image forming apparatus determines whether the screen line number is 133 lines, 166 lines, 200 lines, 268 lines or AUTO (S33, S37, S41, S45). In the case of 133 lines (i.e. answered "Yes" in S41), the real time gradation control is executed every 15 sheets (S42, S43, S44), in the case of 166 lines, the real time gradation control is executed every 10 sheets (S34, S35, S36), in the case of 200 lines, the real time gradation control is executed every 5 sheets (S38, S39, S40) and in the case of 268 lines, the real time gradation control is executed every 10 sheets (S45, S46, S47). On the other hand, in the case of AUTO, the image formation is performed at 166 lines (i.e. answered "No" in S32) and the real time gradation correction is performed every 10 sheets (S34, S35, S36).

As has been described in the forgoing, it is possible to eliminate instability of printing caused by switching of the screen line number can be eliminated by changing stabilization control process. Even in the case that the screen line number of photography portion is separately designated by a user, it is possible to ensure stability of color by performing stability control based on the image forming pattern of that photography portion.

Although the above description of the embodiment is directed to the case in which stabilization control is performed based on the photography portion of an image in which the text portion and the photography portion are mixed, the portion to be based is not limited to the photography portion. It is apparent that the present invention can be applied to the case in which a image portion having gradation (in connection with this, it is defined here that so-called binary images represented by black and white letter images "have no gradation") is present in an image, by focusing on that picture portion. In this invention, such image portions are referred to as "an image portion having gradation".

Embodiment 4

With the following modification to the above-described embodiments, it is possible to attain further improvement in usability and enhancement of image quality.
(Modification (Change) of Stabilization Control)

In connection with the above embodiments, examples in which the frequency of the real time gradation control is increased when the resolution or the line number is increased have been described. However, the object is to improve resolution or to ensure stability of image quality when the line number is increased, and means for attaining the object is not limited to changing of the frequency of correction.

For example, upon switching the basic resolution from 600 dpi to 1200 dpi, the image forming speed (or the process speed) was changed to half the image forming speed under 600 dpi resolution. This means that the sheet interval (i.e. the distance between the trailing edge (with respect to the conveyance direction) of a certain recording material and the leading edge (with respect to the conveyance direction) of the next recording material) during the consecutive image forming jobs is theoretically doubled from the interval under 600 dpi resolution. Consequently, while in 600 dpi resolution, one patch image is formed by one process, in 1200 dpi resolution, a plurality of patch images are formed by one process and stabilization control is performed based on the density of the plurality of patch images. Thus, it is possible to perform image quality stabilization control with a higher degree of accuracy. In other words, it is preferable that more accurate stabilization control be performed by changing the number of patch images formed by one process in accordance with the image resolution that has been changed.

Alternatively, when switching from a low resolution to a high resolution is effected, accuracy may be improved by changing the number of times of sampling of the output of a density detection sensor per unit time upon detecting the density of one patch image by the density detection sensor, and performing averaging processing for many sampling points.

Furthermore, since two-component (mixture of toner and carrier) developing apparatus is used in this embodiment, the stability is greatly influenced by the toner amount in the interior of the developing apparatus 4.

In view of this, it is preferable that the detected density of the aforementioned patch be fed back to the auto toner replenishment (ATR) control for automatically controlling toner amount replenishing the developing apparatus 4 to control the toner replenishment amount with high accuracy.

In addition, as is the case with the above-described embodiments, the frequency of toner replenishment control for the ATR may be increased in accordance with switching of the image resolution (i.e. the resolution of an image as a whole (or the basic resolution) (dpi, lpi)) or switching of the resolution of the bitmap portion of an image. Although it is preferable that a common density detection sensor be used for the gradation control and the ATR control, they cannot be performed at the same timing, since stabilization control (or image forming pattern) for the ATR control is different. However, the problem may be solved by increasing the frequency of the ATR control to perform highly accurate toner replenishment. In this case, it is desirable that the image forming pattern be a patch image that is as close to analogue as possible, that is, for example, an image forming pattern with 600 lines. This is because such a pattern has a high correlation with the toner amount in the interior of the developing apparatus 4 and therefore it enables highly accurate control.

As not only switching of the resolution (dpi) but also switching of the line number (lpi) have been described in connection with the aforementioned embodiments, it should be noted that in the present invention, the term "resolution" also refers to the line number.

As per the above, with the present invention, it is possible to perform excellent image formation without deterioration of image quality, since appropriate image stabilization processing can be effected even if the basic resolution of an image or the resolution of a portion having gradation in an image is changed.

What is claimed is:

1. An image forming apparatus comprising:
    an image forming device that forms a toner image on a sheet, said image forming device including a photosensitive member, a charging device configured to charge said photosensitive member, an exposure device configured to expose said photosensitive member to light to form an electrostatic image thereon, and a developer that develops the electrostatic image with toner to form the toner image that is transferable to the sheet;
    a detection device that detects the density of a patch image formed by said image forming device;
    an input device configured to input by a user one of a plurality of image forming modes including a low resolution mode in which the resolution of the toner image is low and a high resolution mode in which the resolution of the toner image is higher than the resolution of the toner image in the low resolution mode; and
    real-time gradation correction means for forming patch images in real-time to perform real-time gradation control based on the resolution mode input by the input device in an area corresponding to a sheet interval area on said photosensitive member per a first number of sheets in a case where images are continuously formed onto sheets in a low resolution mode, correcting the gradation of the toner image in said image forming device based on said inputted resolution mode in real time and based on each density of the patch images detected by said detection device, forming patch images in real-time to perform real-time gradation control based on the resolution mode input by the input device per a second number of sheets that is less than the first number of sheets in a case where images are continuously formed onto sheets in a high resolution mode, and correcting the gradation of the toner image in said image forming device in real time based on each density of the patch images detected by said detection device based on the resolution mode input by the input device.

2. An image forming apparatus according to claim 1, wherein a number of dots per inch of the toner image when the high resolution mode is selected is larger than the number of dots per inch of the toner image when the low resolution mode is selected.

3. An image forming apparatus according to claim 1, wherein a number of screen lines when the high resolution mode is selected is larger than the number of screen lines when the low resolution mode is selected.

4. An image forming apparatus according to claim 1, wherein said image forming device is capable of forming a full-color image using yellow toner, magenta toner, cyan toner and black toner, and said toner image forming device forms a yellow toner image, a magenta toner image, a cyan toner image, and a black toner image as a test toner image in a control mode.

5. An image forming apparatus according to claim 1, further comprising determination means for, in a case where there is a bitmap image among images to be formed on recording materials comprising the sheets, determining which of high and low resolution modes is used for forming an image from the bitmap image.

* * * * *